United States Patent
Le et al.

(10) Patent No.: US 11,062,587 B2
(45) Date of Patent: Jul. 13, 2021

(54) OBJECT DETECTION

(71) Applicant: Ford Global Technologies, LLC, Dearborn, MI (US)

(72) Inventors: Jialiang Le, Canton, MI (US); James Chih Cheng, Troy, MI (US); Srinivasan Sundararajan, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/612,838

(22) PCT Filed: May 12, 2017

(86) PCT No.: PCT/US2017/032367
§ 371 (c)(1),
(2) Date: Nov. 12, 2019

(87) PCT Pub. No.: WO2018/208315
PCT Pub. Date: Nov. 15, 2018

(65) Prior Publication Data
US 2020/0066136 A1    Feb. 27, 2020

(51) Int. Cl.
G08B 21/24        (2006.01)
G01S 17/04        (2020.01)

(52) U.S. Cl.
CPC .............. *G08B 21/24* (2013.01); *G01S 17/04* (2020.01)

(58) Field of Classification Search
None
See application file for complete search history.

(56) References Cited

U.S. PATENT DOCUMENTS

| | | | |
|---|---|---|---|
| 6,113,137 A | 9/2000 | Mizutani et al. | |
| 6,313,739 B1 | 11/2001 | Roth et al. | |
| 6,857,656 B2 | 2/2005 | Yasui | |
| 7,394,363 B1* | 7/2008 | Ghahramani | G06Q 10/08 340/521 |
| 7,457,695 B1 | 11/2008 | Fields et al. | |
| 8,242,476 B2 | 8/2012 | Mimeault et al. | |
| 9,374,135 B2 | 6/2016 | Fleming et al. | |
| 9,440,289 B1* | 9/2016 | Spariosu | B22F 9/00 |
| 2006/0244828 A1 | 11/2006 | Ho et al. | |
| 2007/0262574 A1 | 11/2007 | Breed et al. | |
| 2010/0201505 A1 | 8/2010 | Honary et al. | |
| 2011/0068954 A1 | 3/2011 | McQuade et al. | |
| 2013/0012123 A1* | 1/2013 | DeLuca | H04M 1/7253 455/39 |
| 2013/0194089 A1* | 8/2013 | Estrada | B60R 22/105 340/457.1 |

(Continued)

FOREIGN PATENT DOCUMENTS

WO        2013133075 A1    9/2013

OTHER PUBLICATIONS

International Search Report of the International Searching Authority for PCT/US2017/032367 dated Jul. 21, 2017.

*Primary Examiner* — Curtis J King
(74) *Attorney, Agent, or Firm* — Brandon Hicks; Bejin Bieneman PLC

(57) ABSTRACT

A lidar is actuated to collect data in a cargo zone in a vehicle. Upon identifying an object in the cargo zone, based on the collected lidar data, output to a user device is actuated.

18 Claims, 5 Drawing Sheets

(56) References Cited

U.S. PATENT DOCUMENTS

| | | | |
|---|---|---|---|
| 2014/0172990 A1* | 6/2014 | Wan | H04W 4/025 |
| | | | 709/206 |
| 2014/0188920 A1* | 7/2014 | Sharma | G06F 16/635 |
| | | | 707/758 |
| 2016/0231420 A1 | 8/2016 | Kryvobok | |
| 2016/0314667 A1* | 10/2016 | Bang-Olsen | A45C 13/18 |
| 2016/0332535 A1 | 11/2016 | Bradley et al. | |
| 2017/0080900 A1 | 3/2017 | Huennekens et al. | |
| 2017/0166121 A1* | 6/2017 | Biondo | B60Q 1/00 |
| 2018/0061129 A1* | 3/2018 | Sisbot | G06T 19/006 |
| 2018/0093675 A1* | 4/2018 | Holub | B60W 30/14 |
| 2018/0094966 A1* | 4/2018 | Buether | B62D 53/068 |
| 2018/0126872 A1* | 5/2018 | Folino | G08B 21/24 |
| 2018/0162415 A1* | 6/2018 | Song | B60W 50/14 |
| 2018/0205457 A1* | 7/2018 | Scheim | H04B 10/40 |
| 2018/0251122 A1* | 9/2018 | Golston | B60W 40/02 |
| 2018/0272977 A1* | 9/2018 | Szawarski | B60N 2/04 |
| 2018/0312083 A1* | 11/2018 | Perez Barrera | B60N 2/01 |
| 2019/0008121 A1* | 1/2019 | Khanna | G06K 9/00718 |
| 2019/0135325 A1* | 5/2019 | Lisseman | G06K 9/00832 |
| 2019/0176760 A1* | 6/2019 | Uenoyama | B60R 25/305 |
| 2019/0266878 A1* | 8/2019 | Nakatsukasa | H04M 19/04 |
| 2019/0303729 A1* | 10/2019 | Gramenos | G06K 9/00832 |
| 2019/0361094 A1* | 11/2019 | Harris | G01S 17/87 |
| 2020/0074492 A1* | 3/2020 | Scholl | G07C 5/0841 |
| 2020/0108744 A1* | 4/2020 | Shiga | B60N 2/3009 |
| 2020/0139853 A1* | 5/2020 | Nawrocki | B60N 2/12 |
| 2020/0207588 A1* | 7/2020 | Zanarini | B66C 19/002 |
| 2020/0273582 A1* | 8/2020 | Ben Gad | G06Q 50/265 |

* cited by examiner

OBJECT DETECTION

BACKGROUND

Vehicles can transport users and cargo to destinations. Upon arriving at their respective destinations, users may inadvertently leave objects such as luggage in the vehicle. In a driverless vehicle, there may be no one remaining in the vehicle to spot an object behind, and to inform a user of the left object. Thus, a technological solution is needed for detecting objects left in the vehicle and informing a user that the object has been left in the vehicle.

DETAILED DESCRIPTION

Figure 1:
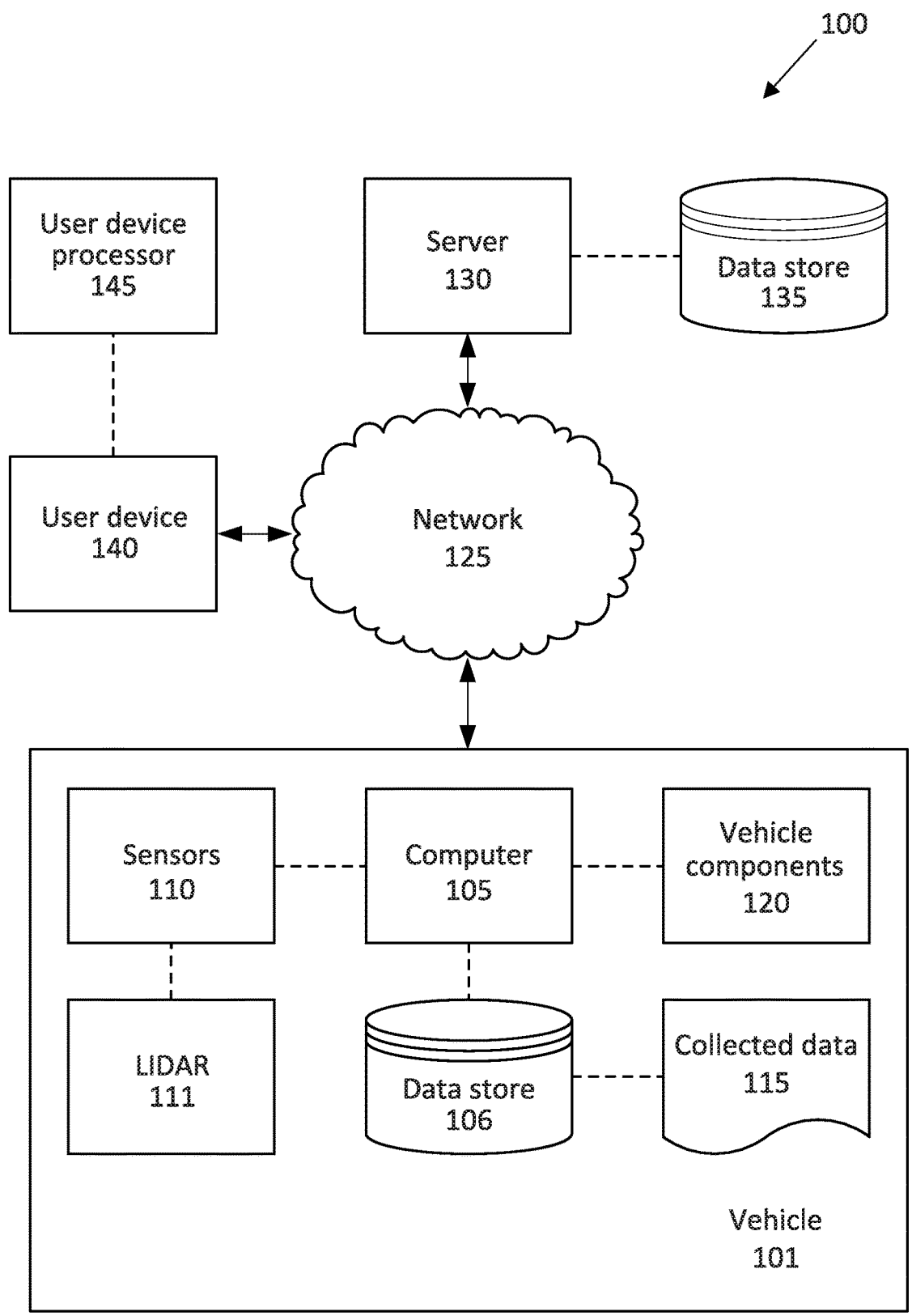
FIG. 1 is a block diagram of an example system for identifying an object in a vehicle.

A system includes a computer programmed to actuate a lidar to collect data in a cargo zone in a vehicle, and, upon identifying an object in the cargo zone based on the collected lidar data, actuate an output to a user device.

The computer can be further programmed to divide the cargo zone into a plurality of detection zones and to actuate the lidar to collect the data in each detection zone.

The computer can be further programmed to actuate the lidar to emit a light beam into the cargo zone, receive a reflected light beam, determine a response time between emitting the light beam and receiving the reflected light beam, and to identify the object in the cargo zone when the response time is below a response time threshold. The computer can be further programmed to divide the cargo zone into a plurality of detection zones, emit the light beam into each of the detection zones, receive a respective reflected light beam for each of the detection zones, determine the response time for each of the detection zones, and identify the object in the cargo zone when the response time for at least one of the detection zones is below the response time threshold.

The vehicle cabin can include a plurality of cargo zones and the computer can be further programmed to associate each cargo zone with one of a plurality of users.

The computer can be further programmed to determine a destination for a user and to actuate the lidar when the vehicle arrives at the destination. The computer can be further programmed to actuate the lidar after a predetermined period of time elapses upon reaching the destination.

The vehicle can include a vehicle seat and a user detection sensor installed in the vehicle seat. The computer can be further programmed to actuate the lidar when the user detection sensor detects that a user has left the vehicle seat.

The computer can be further programmed to actuate the lidar upon detecting that the user device is outside a vehicle cabin.

The computer can be further programmed to actuate the lidar upon detecting a user departure from the vehicle.

A method includes actuating a lidar to collect data in a cargo zone in a vehicle, and, upon identifying an object in the cargo zone based on the collected lidar data, actuating output to a user device.

The method can further include dividing the cargo zone into a plurality of detection zones and to actuate the lidar to collect the data in each detection zone.

The method can further include actuating the lidar to emit a light beam into the cargo zone, receive a reflected light beam, determining a response time between emitting the light beam and receiving the reflected light beam, and to identifying the object in the cargo zone when the response time is below a response time threshold. The method can further include dividing the cargo zone into a plurality of detection zones, emitting the light beam into each of the detection zones, receiving a respective reflected light beam for each of the detection zones, determining the response time for each of the detection zones, and identifying the object in the cargo zone when the response time for at least one of the detection zones is below the response time threshold.

The vehicle cabin can include a plurality of cargo zones and the method can further include associating each cargo zone with one of a plurality of users.

The method can further include determining a destination for a user and actuating the lidar when the vehicle arrives at the destination. The method can further include actuating the lidar after a predetermined period of time elapses upon reaching the destination.

The vehicle can include a vehicle seat and a user detection sensor installed in the vehicle seat. The method can further include actuating the lidar when the user detection sensor detects that a user has left the vehicle seat.

The method can further include detecting that the user has left the vehicle upon detecting that the user device is outside a vehicle cabin.

The method can further include actuating the lidar upon detecting a user departure from the vehicle.

Further disclosed is a computing device programmed to execute any of the above method steps. Yet further disclosed is a vehicle comprising the computing device. Yet further disclosed is a computer program product, comprising a computer readable medium storing instructions executable by a computer processor, to execute any of the above method steps.

FIG. 1 illustrates an example system 100 for identifying an object in a vehicle 101. A computer 105 in the vehicle 101 is programmed to receive collected data 115 from one or more sensors 110. For example, vehicle 101 data 115 may include a location of the vehicle 101, a location of a target, etc. Location data may be in a known form, e.g., geo-coordinates such as latitude and longitude coordinates obtained via a navigation system, as is known, that uses the Global Positioning System (GPS). Further examples of data 115 can include measurements of vehicle 101 systems and components, e.g., a vehicle 101 velocity, a vehicle 101 trajectory, etc.

The computer 105 is generally programmed for communications on a vehicle 101 network, e.g., including a communications bus, as is known. Via the network, bus, and/or other wired or wireless mechanisms (e.g., a wired or wireless local area network in the vehicle 101), the computer 105 may transmit messages to various devices in a vehicle 101 and/or receive messages from the various devices, e.g., controllers, actuators, sensors, etc., including sensors 110. Alternatively or additionally, in cases where the computer 105 actually comprises multiple devices, the vehicle network may be used for communications between devices represented as the computer 105 in this disclosure. In addition, the computer 105 may be programmed for communicating with the network 125, which, as described below, may include various wired and/or wireless networking technologies, e.g., cellular, Bluetooth®, Bluetooth® Low Energy (BLE), wired and/or wireless packet networks, etc.

The data store 106 may be of any known type, e.g., hard disk drives, solid state drives, servers, or any volatile or non-volatile media. The data store 106 may store the collected data 115 sent from the sensors 110.

Sensors 110 may include a variety of devices. For example, as is known, various controllers in a vehicle 101 may operate as sensors 110 to provide data 115 via the vehicle 101 network or bus, e.g., data 115 relating to vehicle speed, acceleration, position, subsystem and/or component status, etc. Further, other sensors 110 could include cameras, motion detectors, etc., i.e., sensors 110 to provide data 115 for evaluating a location of an object, determining the presence of a user, etc. The sensors 110 could also include short range radar, long range radar, and/or ultrasonic transducers.

One of the sensors 110 can be a lidar 111. The lidar 111 can emit a light beam and receive a reflected light beam reflected off an object, e.g., a wall, a piece of cargo, etc. The computer 105 can measure a time elapsed from emitting the light beam to receiving the reflected light beam. Based on the time elapsed and the speed of light, the computer 105 can determine the distance between the lidar 111 and the object reflecting the light beam.

Collected data 115 may include a variety of data collected in a vehicle 101. Examples of collected data 115 are provided above, and moreover, data 115 are generally collected using one or more sensors 110, and may additionally include data calculated therefrom in the computer 105, and/or at the server 130. In general, collected data 115 may include any data that may be gathered by the sensors 110 and/or computed from such data.

The vehicle 101 may include a plurality of vehicle components 120. As used herein, each vehicle component 120 includes one or more hardware components adapted to perform a mechanical function or operation—such as moving the vehicle, slowing or stopping the vehicle, steering the vehicle, etc. Non-limiting examples of components 120 include a propulsion component (that includes, e.g., an internal combustion engine and/or an electric motor, etc.), a transmission component, a steering component (e.g., that may include one or more of a steering wheel, a steering rack, etc.), a brake component, a park assist component, an adaptive cruise control component, an adaptive steering component, and the like.

The system 100 may further include a network 125 connected to a server 130 and a data store 135. The computer 105 may further be programmed to communicate with one or more remote sites such as the server 130, via the network 125, such remote site possibly including a data store 135. The network 125 represents one or more mechanisms by which a vehicle computer 105 may communicate with a remote server 130. Accordingly, the network 125 may be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, BLE, IEEE 802.11, vehicle-to-vehicle (V2V) such as Dedicated Short Range Communications (DSRC), etc.), local area networks (LAN) and/or wide area networks (WAN), including the Internet, providing data communication services.

The system 100 may include a user device 140. As used herein, a "user device" is a portable, computing device that includes a memory, a processor, a display, and one or more input mechanisms, such as a touchscreen, buttons, etc., as well as hardware and software for wireless communications such as described herein. Accordingly, the user device 140 may be any one of a variety of computing devices including a processor and a memory, e.g., a smartphone, a tablet, a personal digital assistant, etc. The user device 140 may use the network 125 to communicate with the vehicle computer 105. For example, the user device 140 can be communicatively coupled to each other and/or to the vehicle computer 105 with wireless technologies such as described above. The user device 140 includes a user device processor 145.

Figure 2:
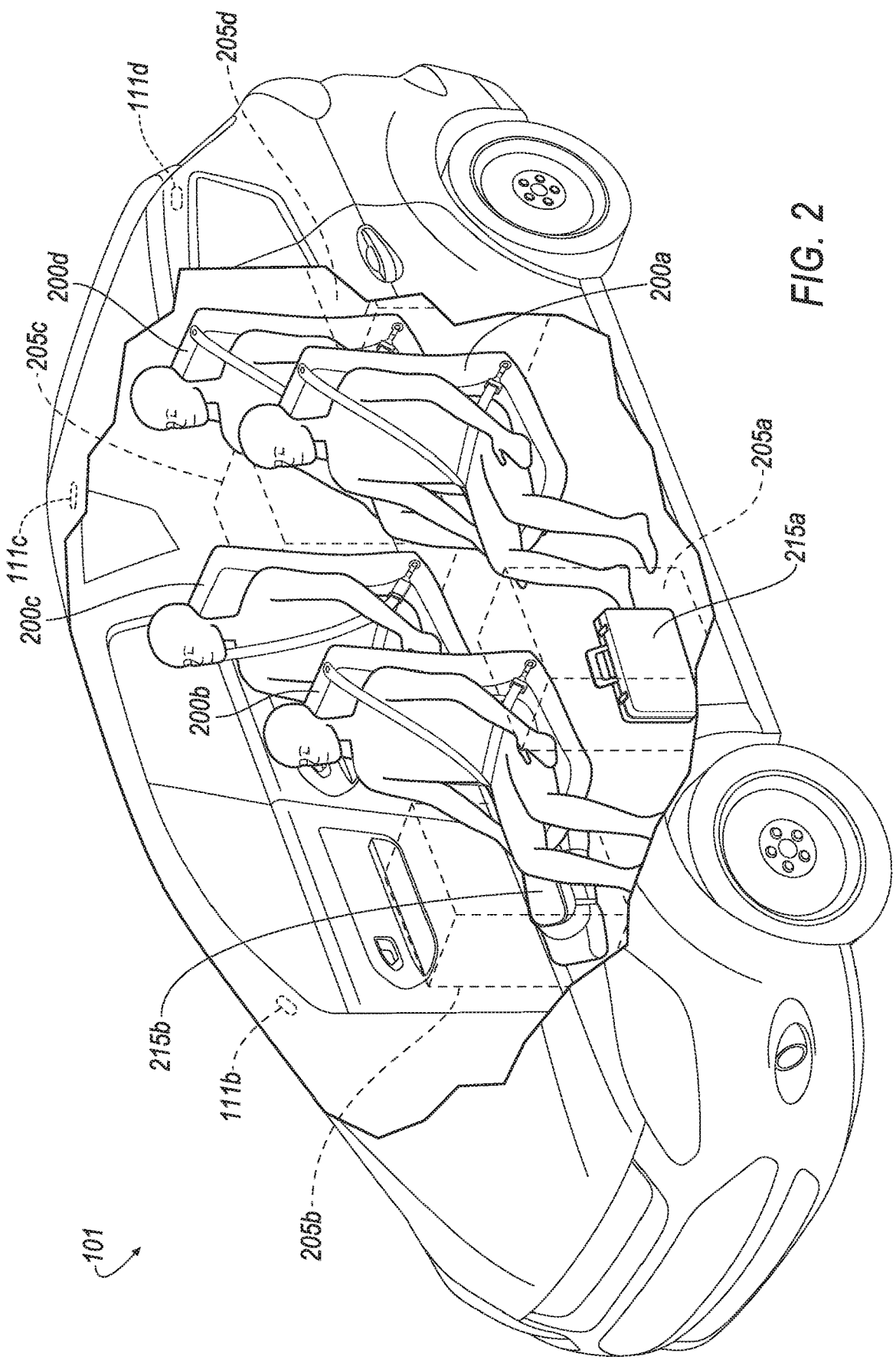
FIG. 2 is a perspective view of an example vehicle.

FIG. 2 illustrates an example vehicle 101. The vehicle 101 includes a plurality of seats 200a, 200b, 200c, 200d, referred to collectively as seats 200. The seats 200 support users in the vehicle 101 cabin. The seats 200 can be arranged in the vehicle 101 cabin to accommodate users and cargo, e.g., luggage. The vehicle 101 can be an autonomous service vehicle 101 that can transport users and cargo to respective destinations.

The vehicle 101 includes a plurality of cargo zones 205a, 205b, 205c, 205d, referred to collectively as cargo zones 205. The cargo zones 205 can be spaces in the vehicle 101 cabin where objects 215 (e.g., luggage, handbags, etc.) can be placed while the vehicle 101 is in transit. The example of FIG. 2 shows two objects 215a, 215b (collectively, objects 215), in the cargo zones 205a, 205b, respectively, and the vehicle 101 can include objects 215 in each of the cargo zones 205. Each cargo zone 205 can be associated with one of the seats 200, e.g., the cargo zone 205a is associated with the seat 200a, the cargo zone 205b is associated with the seat 200b, etc. That is, each user in the vehicle 101 can use one of the cargo zones 205 for storing objects 215, e.g., luggage, while the vehicle 101 is in motion. The computer 105 can determine the specific cargo zone 205 for each seat 200 and can detect objects 215 in the cargo zones 205, as described below. Thus, when one of the users reaches the destination, the computer 105 can determine whether that user has left objects 215 in the respective cargo zone 205.

Figure 3:
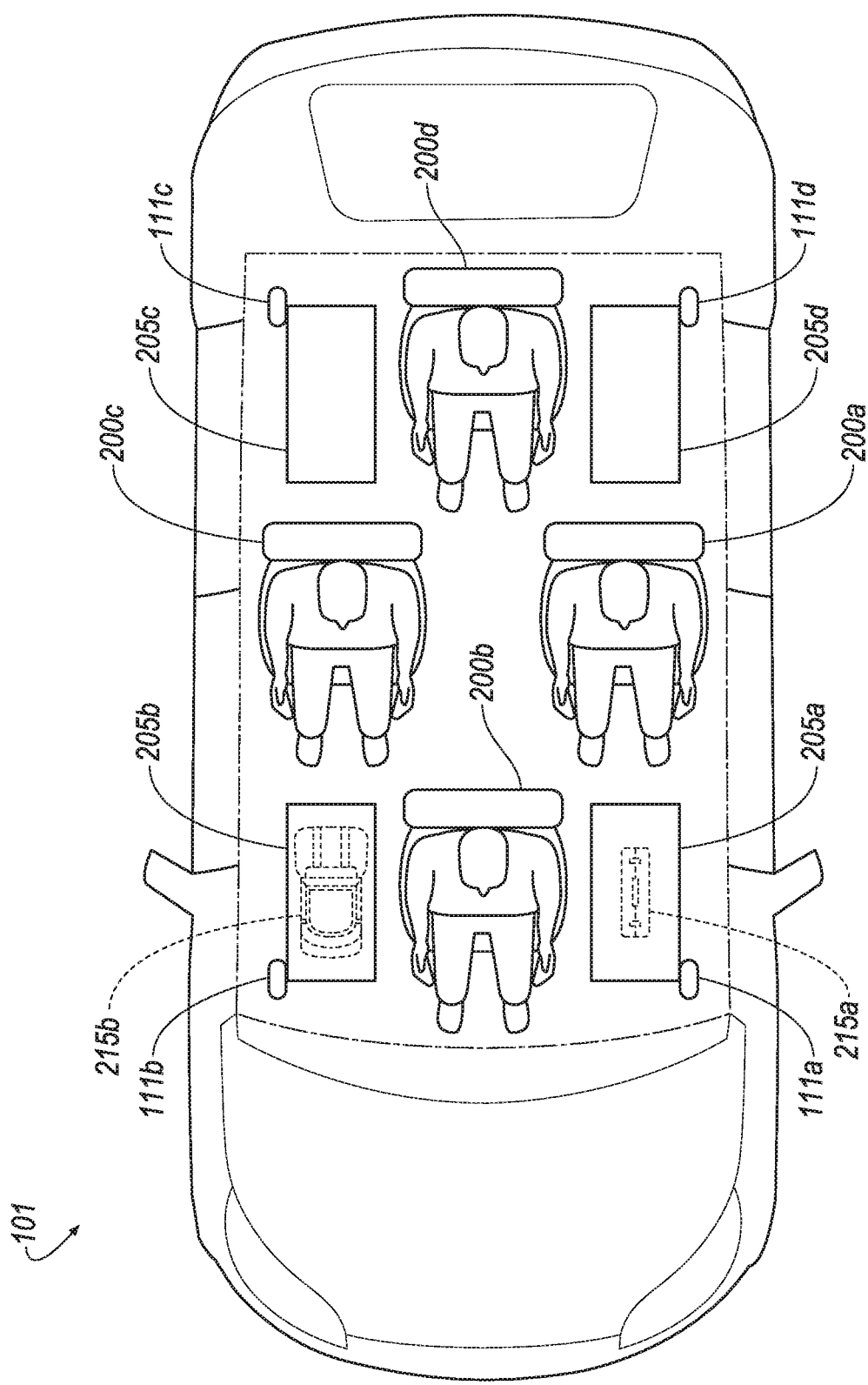
FIG. 3 is a plan view of the example vehicle of FIG. 2.

The vehicle 101 includes a plurality of interior lidar 111 sensors. Each cargo zone 205 can include one of the lidar 111 to identify objects 215 in the cargo zone 205. For example, as shown in FIGS. 2-3, the vehicle 101 can include four lidar 111a (not shown in FIG. 2), 111b, 111c, 111d, referred to collectively as lidar 111. As described below, the lidar 111 can detect objects 215 in the cargo zone 205, and the computer 105 can communicate with one of the users of the vehicle 101 when the user departs the vehicle 101 and leaves one or more objects 215 in the cargo zone 205.

The computer 105 can detect a user leaving the vehicle 101 with a user detection sensor 110 installed in the seat 200. The user detection sensor 110 can be a sensor known for use to detect an occupant or user presence in a vehicle 101, e.g., a weight sensor, a camera, etc., as is known. Each seat 200 can include a user detection sensor 110. The user detection sensor 110 can detect the presence of a user sitting on the seat 200. The user detection sensor 110 can send data 115 to the computer 105, and the computer 105 can determine whether a user is present in the seat 200. The computer 105 can compare the data 115 from the user detection sensor 110 to a threshold. When the data 115 from the user detection sensor 110 exceeds the threshold, the computer 105 can determine that a user is in the seat 200. For example, if the user detection sensor 110 is a weight sensor, the computer 105 can compare collected user weight data 115 to a weight threshold. When the user weight data 115 exceed the weight threshold, the computer 105 can determine that the user is present in the seat 200. When the data 115 from the user detection sensor 110 is below the threshold (e.g., the user weight data 115 are below the weight threshold), the computer 105 can determine that the user is not in the seat 200. Furthermore, when the computer 105 determines that the user is not in the seat 200 upon arriving at the destination and that the user was in the seat 200 at a time prior to arriving at the destination, the computer 105 can determine that the user has left the seat 200. The computer 105 can associate the cargo zone 205 associated with the seat 200 to the user in the seat 200. Thus, upon detecting that the user has left the seat 200, the computer 105 can search for objects 215 left in the cargo zone 205. For example, if the user sits in the seat 200*a*, the computer 105 can send a message to the user device 140 indicating the cargo zone 205*a* and instructing the user to place his or her luggage in the cargo zone 205*a*. When the user leaves the seat 200*a*, the computer 105 can actuate the lidar 111*a* in the cargo zone 205*a* to detect if the user left behind objects 215.

The computer 105 can detect the user departure from the vehicle 101 by detecting a location of the user device 140. The vehicle 101 can include a plurality of sensors 110, e.g., BLE proximity sensors 110, that can detect a location of the user device 140 in the vehicle 101. The computer 105 can communicate with the user device 140 with data 115 about the location of the user device 140. When the sensors 110 detect that the location of the user device 140 is outside the vehicle 101 cabin, the computer 105 can determine that the user that possesses the user device 140 is outside the vehicle 101 cabin, i.e., that user has departed the vehicle 101.

The computer 105 can actuate the lidar 111 for at least one of the cargo zones 205 upon arriving at the destination. When the vehicle 101 stops at the destination, the computer 105 can actuate the lidar 111 to detect objects 215 in the cargo zone 205 corresponding to the user departing at the destination. When the computer 105 identifies an object 215 in the cargo zone 205 based on the lidar 111 data 115, the computer 105 can actuate user output on a user device 140 of the user departing at the destination. For example, the computer 105 can send a message to the user device 140, actuate a haptic feedback device in the user device 140, flash a light in the user device 140, actuate a speaker in the user device 140 to produce an audio cue, etc. The computer 105 can wait for a predetermined period of time (stored in the data store 106 and/or the server 130) and actuate the user output after the period of time elapses at the destination.

FIG. 3 illustrates a plan view of the vehicle 101. As described above, the vehicle 101 includes a plurality of seats 200. In the example of FIGS. 2-3, the vehicle 101 includes four seats 200*a*, 200*b*, 200*c*, 200*d*. Each seat 200 is associated with a respective cargo zone 205 and lidar 111, e.g., the seat 200*a* is associated with the cargo zone 205*a* and the lidar 111*a*, the seat 200*b* is associated with the cargo zone 205*b* and the lidar 111*b*, the seat 200*c* is associated with the cargo zone 205*c* and the lidar 111*c*, and the seat 200*d* is associated with the cargo zone 205*d* and the lidar 111*d*. In one example, instead of each cargo zone 205 being statically associated with respective seats 200 as just described, the computer 105 can determine the cargo zone 205 associated with each seat 200 prior to collecting the users. Upon detecting the user in one of the seats 200, the computer 105 can send a notification to the user device 140 indicating the cargo zone 205 associated with the selected seat 200. Alternatively, the computer 105 can detect the seat 200 of the user and can actuate the lidar 111 to determine whether one of the cargo zones 205 has an object 215 that did not have an object 215 prior to the user entering the vehicle 101. Upon detecting a new object 215 in one of the cargo zones 205, the computer 105 can associate that cargo zone 205 with the seat 200 selected by the user. Thus, upon arriving at the user's destination, the computer 105 can actuate the lidar 111 in the cargo zone 205 to detect whether the user has retrieved the object 215.

The lidar 111 can detect objects 215 in the cargo zone 205. When the vehicle 101 is an autonomous service vehicle 101, the seats 200 and cargo zones 205 can be arranged to increase space for the users in the vehicle 101 cabin. For one non-limiting example, each seat 200 can be disposed between two of the cargo zones 205, as shown in FIG. 3. In a more specific non-limiting example, seats 200 can be arranged in a substantially cross-shaped pattern, allowing users access to the cargo zones 205 and the vehicle 101 doors.

Figure 4A:
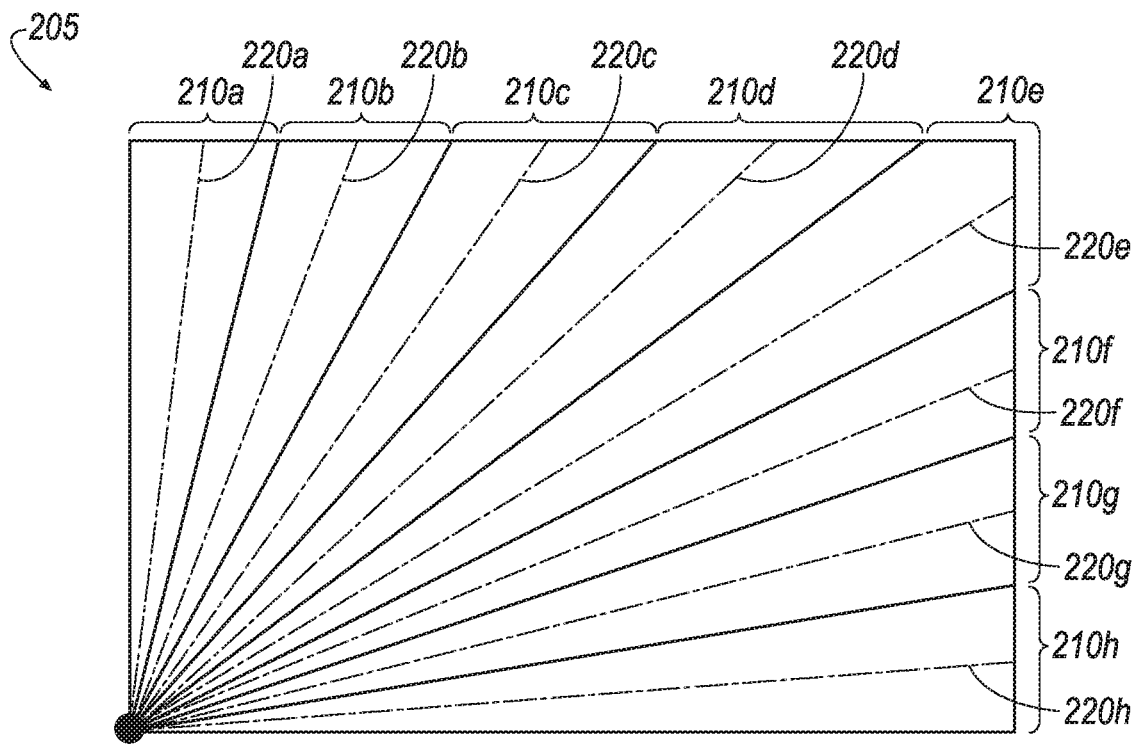
FIG. 4A is a view of an example cargo zone in the vehicle.
Figure 4B:
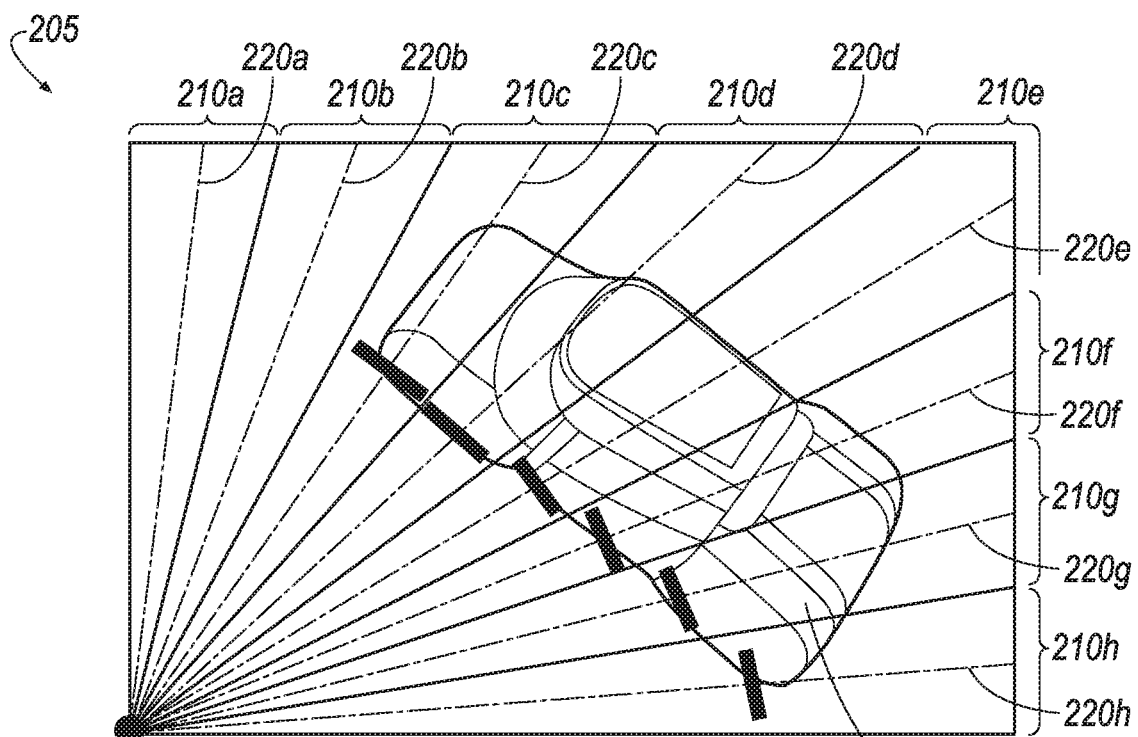
FIG. 4B is a view of the example cargo zone with an object detected by a lidar.

FIGS. 4A and 4B illustrate an example lidar 111 detecting objects in a cargo zone 205. FIGS. 4A-4B shows the cargo zone 205 divided into a plurality of detection zones 210*a*-210*h*, collectively, detection zones 210. The computer 105 can actuate the lidar 111 in each of the detection zones 210 to identify an object 215 in the cargo zone 205. Each detection zone 210 can have a length 220. The length 220 of the detection zone 210 can be defined by the size of the cargo zone 205, e.g., the length 220 can be the distance from the lidar 111 to the boundary of the cargo zone 205. In the examples of FIGS. 4A and 4B, the cargo zone 205 has eight detection zones 210*a*-210*h* having respective lengths 220*a*-220*h*, and the cargo zone 205 may have a different number of detection zones 210.

The lidar 111 can detect an object 215 in the cargo zone 205. The lidar 111 can emit a light beam (e.g., a laser) into the detection zone 210. The lidar 111 can receive the reflected light beam in the detection zone 210. The computer 105 can measure a response time between emission of the light beam and receipt of the reflected light beam. Based on the response time and the speed of light, as is known, the computer 105 can determine the distance between the surface reflecting the light beam and the lidar 111. Alternatively or additionally, the computer 105 can compare the response time to a response time threshold. The response time threshold can be determined based on the time for the emitted light beam to reach the boundary of the cargo zone 205. If the response time is above the response time threshold, (i.e., the distance is beyond the boundary of the cargo zone 205), the computer 105 can determine that the detection zone 210 does not include any object 215. If the computer 105 determines that all detection zones 210 have no object 215, as shown in FIG. 4A, the computer 105 can determine that the cargo zone 205 does not include any object 215. If the response time is below the response time threshold, the computer 105 can determine that the detection zone 210 has an object 215. If the computer 105 determines that at least one of the detection zones 210 has an object 215, as shown in FIG. 4B, the computer 105 can determine that the cargo zone 205 includes an object.

Figure 5:
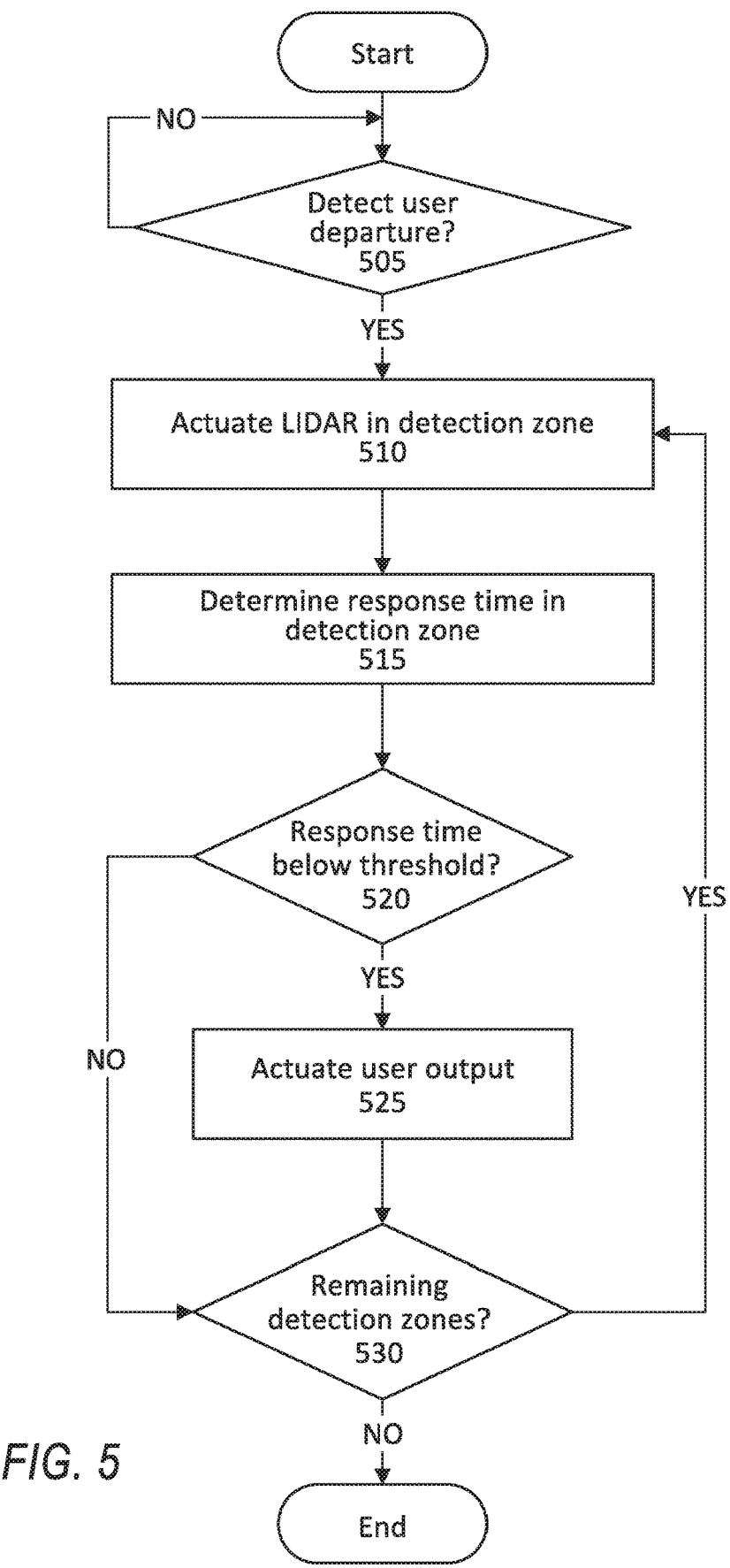
FIG. 5 is an example process for detecting the object in the vehicle.

FIG. 5 illustrates an example process 500 for detecting an object 215 in the vehicle 101. The process 500 begins in a block 505, in which the computer 105 determines whether a user departure from the vehicle 101 is detected. As described above, the computer 105 can detect the user leaving the vehicle 101 by, e.g., collecting data 115 from a user detection sensor 110 in a vehicle seat, arriving a predetermined destination for the user, collecting visual data 115 about the user, detecting a user device 140 outside of the vehicle 101 cabin, shutting off the vehicle 101, etc. If the computer 105 detects a user departure, the process 500 continues in a block 510. Otherwise, the process 500 remains in the block 505.

In the block 510, the computer 105 actuates a lidar 111 in a detection zone 210 of a cargo zone 205 associated with the user. As described above, the computer 105 can divide the cargo zone 205 into a plurality of detection zones 210 and actuate the lidar 111 in one of the detection zones 210. The lidar 111 can emit a light beam into the detection zone and receive the reflected light beam from, e.g., an object 215 in the detection zone 210.

Next, in a block 515, the computer 105 determines a response time for one of the detection zones 210. Based on the time of initiating the lidar 111 and the speed of light, the computer 105 can determine the time between emitting the light beam and receiving the reflected light beam reflected from an object 215.

Next, in a block 520, the computer 105 determines whether the response time for the detection zone 210 is below a time threshold. The detection zone 210 can have a predetermined boundary, and the time threshold can be based on the distance between the lidar 111 and the predetermined boundary. When the response time is below the time threshold, the computer 105 can determine that the light beam reflected off an object 215 in the detection zone 210. When the response time is above the time threshold, the computer 105 can determine that the light beam reflected off an object 215 outside the detection zone 210. If the computer determines that the response time for the detection zone 210 is below the time threshold, the process 500 continues in a block 525. Otherwise, the process 500 continues in a block 530.

In the block 525, the computer 105 actuates output to the user device 140. For example, the computer 105 can send a message over the network 125 to the user device 140. Alternatively or additionally, the computer 105 can actuate a haptic device and/or a light and/or an audio cue on the user device 140. As described above, the message can state that the user has left the object 215 (e.g., luggage) in the cargo zone 205.

In the block 530, the computer 105 determines whether there are remaining detection zones 210 in the cargo zone 205. If there are remaining detection zones 210 in the cargo zone 205, the process 500 returns to the block 510 to actuate the lidar 111 in another detection zone 210. Otherwise, the process 500 ends.

As used herein, the adverb "substantially" modifying an adjective means that a shape, structure, measurement, value, calculation, etc. may deviate from an exact described geometry, distance, measurement, value, calculation, etc., because of imperfections in materials, machining, manufacturing, data collector measurements, computations, processing time, communications time, etc.

Computers 105 generally each include instructions executable by one or more computers such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in the computer 105 is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. For example, in the process 500, one or more of the steps could be omitted, or the steps could be executed in a different order than shown in FIG. 5. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

The article "a" modifying a noun should be understood as meaning one or more unless stated otherwise, or context requires otherwise. The phrase "based on" encompasses being partly or entirely based on.

What is claimed is:

1. A system, comprising a computer programmed to:
   actuate a lidar to emit a light beam into a cargo zone in a vehicle to collect data;

receive a reflected light beam;

determine a response time between emitting the light beam and receiving the reflected light beam;

identify an object in the cargo zone when the response time is below a response time threshold, the response time threshold based on a distance from the lidar to a boundary of the cargo zone; and upon identifying the object in the cargo zone, actuate output to a user device.

2. The system of claim 1, wherein the computer is further programmed to divide the cargo zone into a plurality of detection zones and to actuate the lidar to collect the data in each detection zone.

3. The system of claim 1, wherein the computer is further programmed to divide the cargo zone into a plurality of detection zones, emit the light beam into each of the detection zones, receive a respective reflected light beam for each of the detection zones, determine the response time for each of the detection zones, and identify the object in the cargo zone when the response time for at least one of the detection zones is below the response time threshold.

4. The system of claim 1, wherein a vehicle cabin includes a plurality of cargo zones and the computer is further programmed to associate each cargo zone with one of a plurality of users.

5. The system of claim 1, wherein the computer is further programmed to determine a destination for a user and to actuate the lidar when the vehicle arrives at the destination.

6. The system of claim 5, wherein the computer is further programmed to actuate the lidar after a predetermined period of time elapses upon reaching the destination.

7. The system of claim 1, wherein the vehicle includes a vehicle seat and a user detection sensor installed in the vehicle seat, and wherein the computer is further programmed to actuate the lidar when the user detection sensor detects that a user has left the vehicle seat.

8. The system of claim 1, wherein the computer is further programmed to actuate the lidar upon detecting that the user device is outside a vehicle cabin.

9. The system of claim 1, wherein the computer is further programmed to actuate the lidar upon detecting a user departure from the vehicle.

10. A method, comprising:

actuating a lidar to emit a light beam into a cargo zone in a vehicle to collect data;

receiving a reflected light beam;

determining a response time between emitting the light beam and receiving the reflected light beam;

identifying an object in the cargo zone when the response time is below a response time threshold, the response time threshold based on a distance from the lidar to a boundary of the cargo zone; and upon identifying the object in the cargo zone, actuating output to a user device.

11. The method of claim 10, further comprising dividing the cargo zone into a plurality of detection zones and to actuate the lidar to collect the data in each detection zone.

12. The method of claim 10, further comprising dividing the cargo zone into a plurality of detection zones, emitting the light beam into each of the detection zones, receiving a respective reflected light beam for each of the detection zones, determining the response time for each of the detection zones, and identifying the object in the cargo zone when the response time for at least one of the detection zones is below the response time threshold.

13. The method of claim 10, wherein a vehicle cabin includes a plurality of cargo zones and the method further comprises associating each cargo zone with one of a plurality of users.

14. The method of claim 10, further comprising determining a destination for a user and actuating the lidar when the vehicle arrives at the destination.

15. The method of claim 14, further comprising actuating the lidar after a predetermined period of time elapses upon reaching the destination.

16. The method of claim 10, wherein the vehicle includes a vehicle seat and a user detection sensor installed in the vehicle seat, and wherein the method further comprises actuating the lidar when the user detection sensor detects that a user has left the vehicle seat.

17. The method of claim 10, further comprising actuating the lidar upon detecting that the user device is outside a vehicle cabin.

18. The method of claim 10, further comprising actuating the lidar upon detecting a user departure from the vehicle.

* * * * *